Aug. 6, 1929.　　　E. K. HUNTER ET AL　　　1,723,784
SETTING MECHANISM
Filed Nov. 21, 1922　　5 Sheets-Sheet 1
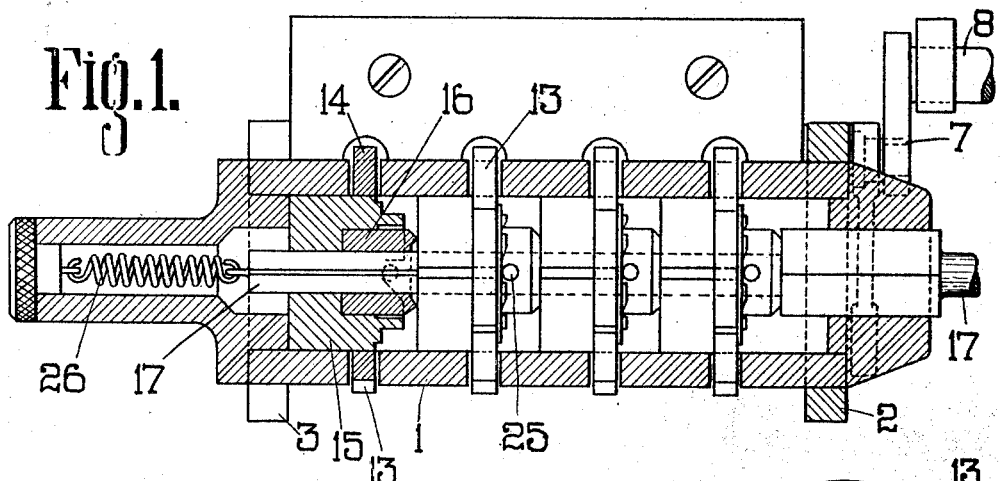
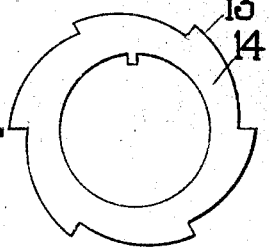
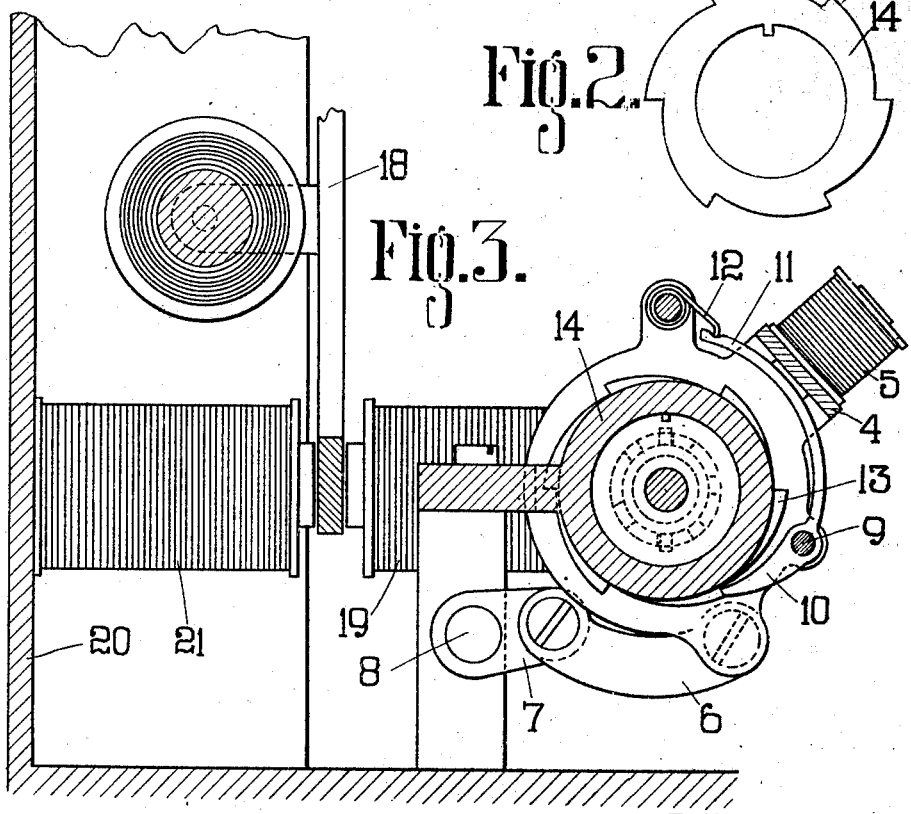

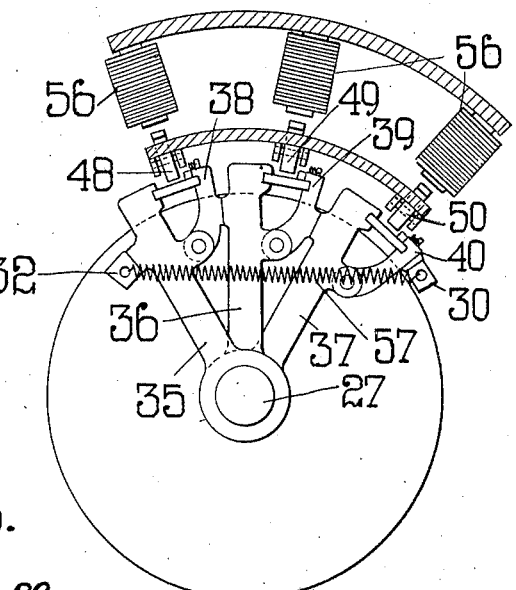
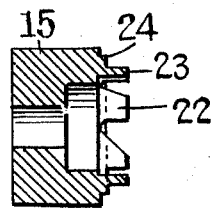
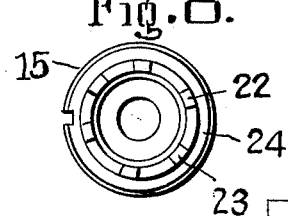
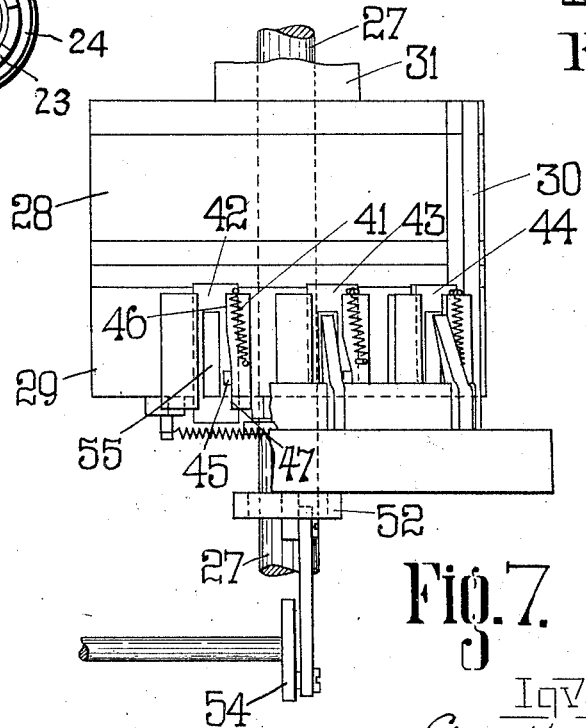
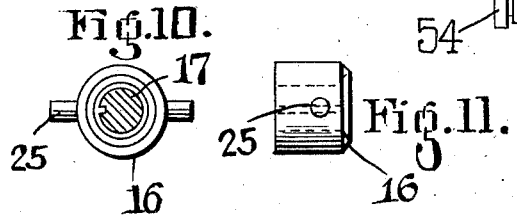

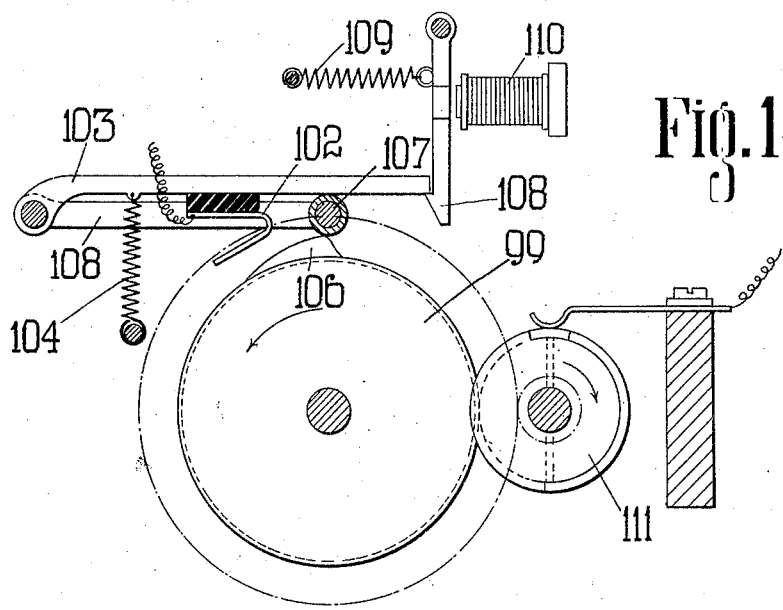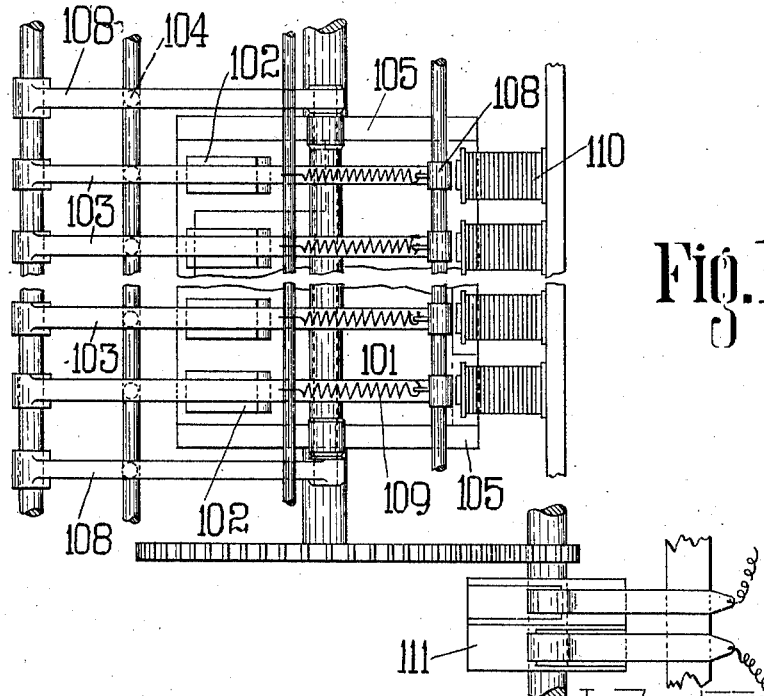

Patented Aug. 6, 1929.

1,723,784

UNITED STATES PATENT OFFICE.

EDGAR KENNETH HUNTER AND JOHANNES ROBERT CARL AUGUST, OF LONDON, ENGLAND; SAID HUNTER ASSIGNOR TO SAID AUGUST.

SETTING MECHANISM.

Application filed November 21, 1922, Serial No. 602,475, and in Great Britain November 29, 1921.

The present invention relates to an improved setting mechanism applicable for a plurality of purposes whereby a tool can be displaced or set to absolute predetermined limits. According to the present invention the displacement of an element is operated by the integration of a number of consecutive displacements between predetermined set limits of a second element periodically coupled to it.

Where it is desired to displace an element through a predetermined distance with a high degree of accuracy means are provided to clutch this element periodically to a second moving element capable of reciprocation between stops which can be set up with considerable accuracy.

The present invention is more particularly described with reference to the accompanying drawings, in which:—

Figure 1 is a sectional elevation, of one form of construction,

Figure 2 is a detail thereof,

Figure 3 is a corresponding and sectional view with certain added matter,

Figure 6 is an end view corresponding to Figure 5,

Figure 7 is a plan view corresponding to Figs. 5 and 6.

Figures 8 to 11 are details of parts of Figs. 1 and 3.

Figure 14 is a sectional elevation of controlling mechanism,

Figure 15 is a corresponding plan view.

Figure 4:
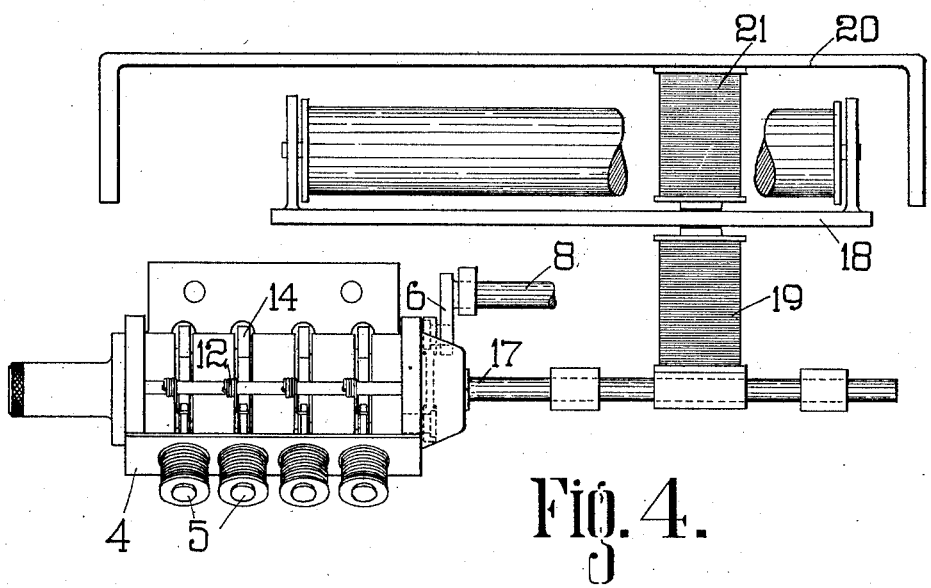
Figure 4 is an outside plan view on a reduced scale of Figure 3.

The device shown with reference to Figs. 1 to 5 comprises a fixed casing 1 having a pair of end flanges 2, 3, revoluble upon it connected by a bridge 4 which bridge supports a number of electromagnets 5. The end flange 2 is connected by a link 6 to a crank 7 on an oscillating shaft 8.

Between the end flanges 2, 3, is arranged a spindle 9 about which can rock a number of pawls 10 having rear extension arms 11 adapted to be individually lifted by the electromagnetic attraction of the electromagnets 5 against the action of return springs 12. The pawls 10 engage with ratchet teeth 13 on rings 14 slidable along a feather on sleeves 15 having bushes 16 revoluble relative to them, but keyed on and sliding longitudinally upon the spindle 17 which itself can move axially, but not rotatably. The reciprocation of the spindle between accurate and precisely set limits can be conveyed to any element to be displaced such as a carriage 18 by periodic coupling with this carriage by means of an electromagnet 19 or otherwise. At times when it is desired to lock the carriage 18 precisely from movement this can be effected by electromagnetically coupling it to a fixed rail or casing 20 by means of an electromagnet 21.

The sleeves 15 (Figs. 8 to 11) have cam projections 22 upon them extending from upper to lower surfaces 23, 24, which can be ground precisely to present a definite and accurate distance between them. These cam projections 22 lift pins 25 on the bushes 16 from one accurately ground flanged surface 24 to the surface 23 lying at the precisely predetermined distance from it.

In the arrangement shown bushes 16 (four in number) are each provided with cam projections of different heights. It will be seen that if these heights are formed in the well known mathematical ratio 1, 2, 4, 8, . . . that the spindle 17 can at any single reciprocation be displaced between very accurately set limits to any amount from unity to the sum of the distance between the surfaces 23, 24 of the elements (in the present instance four in number). In the arrangement shown a spring 26 acts to return the spindle 17 to the initial position. It will be seen that the casing thus supports one end of one of the sleeves 15 which thus remains as an abutment fixed with respect to the casing so that it does not move axially with regard to the same. The rotational movement of this sleeve 15 however causes the bushing 16 to move axially as a movable abutment cooperating with the aforesaid fixed abutment 16. The bushing 16 causes an axial movement of the succeeding sleeve 15, which in turn acts relatively as a fixed abutment for its own movable abutment, and so on: the sleeves and bushings acting relatively to each other successively as fixed and movable abutments, the distance of movement of each of the movable abutments being predetermined by the distances between the upper and lower parallel surfaces as 23 and 24 (Fig. 14), so that it is possible to obtain definite axial movements of the parts, resulting in a predeterminable and preset axial movement of the spindle 17.

Figure 5:
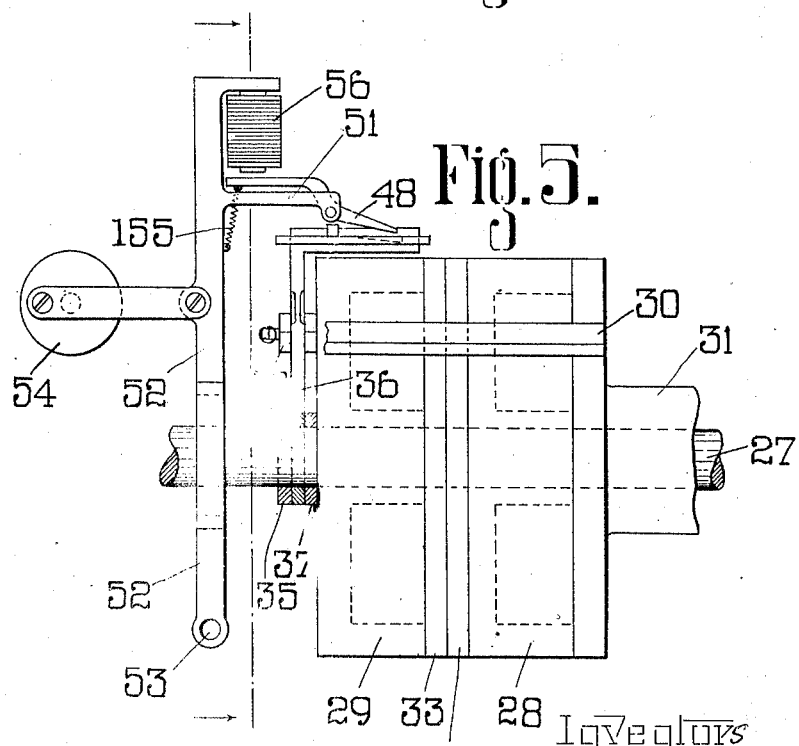
Figure 5 is an outside elevation of a modified form of construction.

In the modified form of construction shown with reference to Figs. 5 to 7, an arrangement is shown whereby a spindle 27 can be rotated angularly between equal precise set limits. The magnet 28 is keyed to the spindle 27 and the magnet 29 is loose thereon. The stop 30 is mounted on the rigid part of the casing and is attached to the bearing 31 for the spindle 27. A stop 32 is similarly attached to the magnet 29, and has a plate of brass or the like non-magnetic material 33, and an iron disc 34 secured at the back, this plate 33 isolating one magnet from the other. Three or a greater number of arms as desired 35, 36, 37 are arranged all to be freely revoluble about the spindle 27. Each arm has an extension 38, 39, 40 respectively pivoted on it. Within the extensions 38, 39, 40, respectively controlled by springs 41 guide grooves are provided for slides 42, 43, 44 respectively, having pins 45 on them engaging with inclined surfaces on the extensions or arms 38, 39, 40 which surfaces extend between accurately ground surfaces 46, 47 on these arms.

A number of pawls 48, 49, 50 are provided pivoted on bracket 51 of a lever 52 pivoted at 53, and constantly oscillated from a crank disc 54 or the like. The outer ends of the pawls 48 are held normally away from the slots 55 in the slides 42 43 44 by tension springs 155, but can be brought into engagement with the slide by means of electromagnets 56. Should now one or other of these electromagnets 56 be energized it will be seen that the corresponding pawl or pawls will fall into the slots and so displace the corresponding slide so that the spindle 27 and the movable stops 32 will be displaced by a variable but extremely accurately predetermined amount relative to the stop 30.

By suitably energizing therefore the magnet 28 the spindle 27 will be locked so that if stop 32 is displaced relatively to stop 30, and then the magnet 29 magnetized to be connected to the magnet 28 the pivoted arm 52 on returning and carrying with it the pawls 48, 49 and 50 will carry certain slides with it. Magnet 28 can now be demagnetized whereupon the spindle 27 will be turned under the action of the spring 57 by the precise amount corresponding to the integrated differences between the surfaces 46, 47 of those slides which have been displaced by the pawls 48.

Figure 12:
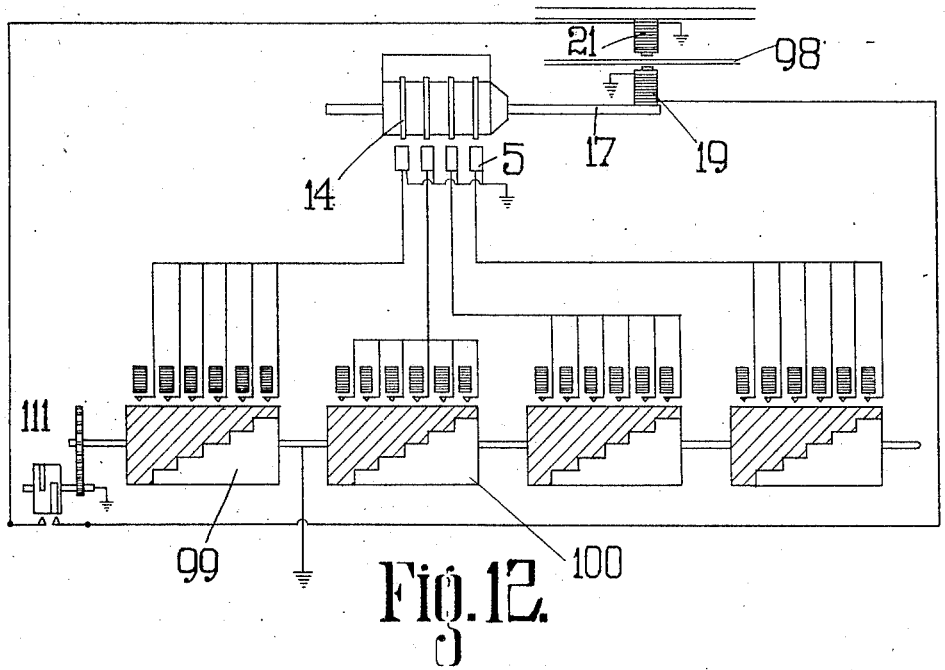
Figures 12 and 13 are diagrammatic views.
Figure 13:
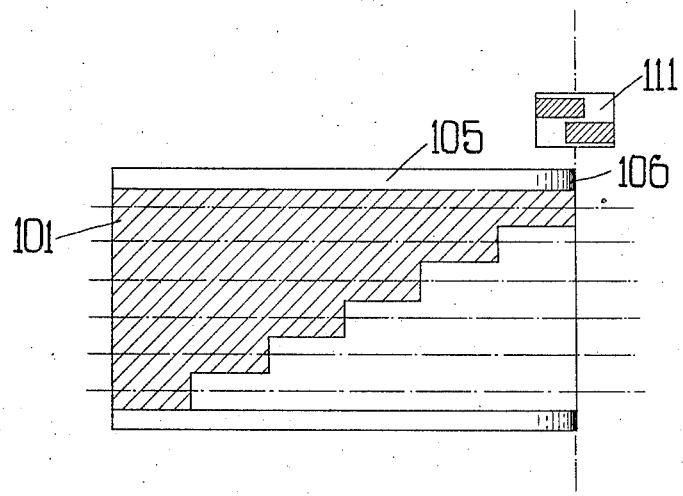

It will frequently be desirable to provide means whereby the spindle can be turned angularly through the precise set limits or displaced longitudinally through equally precise limits for the displacement for instance of an element such as 98, Fig. 12. The arrangement will be described more particularly in connection with the displacement of a spindle by mechanism such as described with reference to Figs. 1 to 4. A number of controller drums 99, 100 ... are provided the surface of each of which has electrical conducting segments 101 of different length (Fig. 13) adapted to co-operate with brushes 102 (Fig. 14) mounted on pivoted levers 103 normally held down upon the commutator surface 101 by springs 104.

In the construction shown with regard to Figs. 1 to 5, the rings 14 are shown with six ratchet teeth 13 so that if mechanism similar to this construction is adopted the commutator drums 99, 100 ... will also have six separate sections of different developed length corresponding to the angular segments of the ratchet teeth 13, that is to say that supposing it is desired to rotate the ratchet ring 14 for a continuous revolution then the electromagnet 5 of this particular ring will be energized by allowing the brush 102 to contact with the first or longest segment of the drum 99, 100 as the case may be. The commutator drums are provided at their ends with rings 105 having operative cam surfaces 106 which engage a spindle 107 on pivoted arms 108. This spindle 107 lies under the levers 103 so that once per revolution of the commutator drum 99, 100 as the case may be all the levers 103 will be lifted away from the corresponding commutator segments into range of a locking catch 108 controlled by a spring 109. Immediately after the cam 106 has passed the roller 107, should any of the electromagnets 110 be energized the catch 108 will be drawn away against the action of the spring 109 to free the brush 102 for the energizing of a particular electromagnet 5 for a variable period of time.

In geared relationship with the spindle carrying the commutator drums 99, 100 ... is a master switch drum 111 which will in this instance rotate six times for every revolution of the commutator drum (each of these has six segments of different length). The switch drum 111 has two contact strips slightly overlapping with one another one of which operates the energizing of electromagnet 21 while the other operates the energizing of electromagnet 19. It will consequently be seen that at certain times the element 98 will be locked rigidly against motion while at other times it will be locked to the longitudinal displaceable spindle 17 so that if any of the electromagnets 5 are energized from the commutator drum 99, 100 ... the spindle 17 will be restricted within very precise limits in an automatic manner. It will consequently be seen that for each rotation of the commutator drum 99, 100, as the case may be in the actual construction shown, the spindle 17 is capable of being displaced by an amount between unity and six times the sum of the distance between the maximum and minimum heights of the operative cam surface on the bushes 16.

We declare that what we claim is:—

1. A mechanism for displacing an element by a selected one of several predetermined fixed amounts, comprising a fixed abutment, a movable abutment connected to the element to be displaced, a number of loosely mounted elements between said fixed abutment and said movable abutment each having a pair of spaced parallel surfaces connected together by an inclined surface, an auxiliary member mounted between each of two adjacent loosely mounted elements, and presenting a bearing surface to contact said surfaces of the cooperating element, and means to displace said members selectively relative to said elements so that said bearing surface on said selected member moves from one of said parallel surfaces along the inclined surface of the selected cooperating element until it comes to abut on the second parallel surface of the said element.

2. A mechanism for displacing an element by a selected one of several predetermined fixed amounts, comprising a fixed abutment, a movable abutment connected to the element to be displaced, and a number of loosely mounted elements between said fixed abutment and said movable abutment, certain of said elements having each a pair of spaced parallel surfaces connected together by an inclined surface, each of said certain elements cooperating with a respective other of said elements, each of said other elements having a bearing surface to contact said parallel and inclined surfaces of the cooperating certain element according to the relative position of the respective elements, and means to displace said elements selectively relatively one to another so that the bearing surface of the selected one of said other elements moves from one of said parallel surfaces along the inclined surface of the respective cooperating element until it comes to abut on the second parallel surface of said element.

3. A mechanism as in claim 2, in which the distance between the two parallel surfaces on each of said certain elements is different, so that the mechanism can accomplish displacements of differing predetermined amounts.

4. A mechanism as in claim 2, in which the distance between the parallel surfaces of said certain elements differs from one another in the ratio of a geometrical progression.

5. A mechanism as in claim 2, in which the distance between the parallel surfaces of said certain elements differs from one another in the ratio of a fundamental geometrical progression, 1, 2, 4, 8, 16 ....

6. A mechanism for displacing an element by a predetermined amount comprising a fixed abutment, a movable abutment connected to the element to be displaced, a number of loosely mounted elements between said abutments, one of said loosely mounted elements having a pair of surfaces thereon parallel to each other and at right angles to the direction of displacement of the movable abutment and an inclined cam surface connecting said parallel surfaces, and a pin connected to another of said loosely mounted elements and contacting said surfaces.

7. A mechanism for displacing an element by a predetermined amount comprising a fixed abutment, a movable abutment connected to the element to be displaced, a rotatable element between said abutments, an axially movable element between said abutments, one of said latter elements having two parallel surfaces thereon located at right angles to the direction of movement of said displaceable element and an inclined surface joining said parallel surfaces, and means on said other element to engage said surfaces so that, during the rotation of said rotatable element, said means and inclined surface cooperate to cause a displacement of said displaceable element in an axial direction with respect to said first element.

8. A mechanism for displacing an element by a predetermined amount comprising an axially movable spindle, a stop rigid on said spindle, a fixed abutment, a pair of loose elements between said fixed abutment and said stop and in contact one with another, one of said loose elements having a pair of parallel surfaces united by an inclined cam portion on the end adjacent said other element, means on said other element to contact said surfaces and to move therealong during relative movement of said elements, and means to displace one of said elements so that said first means and surfaces may move relatively one to another so that said means will pass from one of said parallel surfaces to the other.

9. A mechanism for displacing an element by a predetermined amount comprising a fixed abutment, a movable abutment, and pairs of loose elements between said fixed and movable abutments, one of each pair of elements having a pair of parallel surfaces joined together by an inclined cam portion, the height between said parallel surfaces being of different amounts in each pair, the other element of each pair having a part fixed thereon to contact with said surfaces and cam portion of its associated first element and to move therealong during relative movement of said elements.

10. A mechanism for displacing an element by a predetermined amount comprising a fixed abutment, a movable abutment, a plurality of pairs of loose elements between said fixed and movable abutments, one element of each pair having a pair of parallel surfaces thereon joined by an inclined cam portion, the height between said parallel surfaces being of different amounts between the several pairs in the ratio of the fundamental geometrical progression, 1, 2, 4, 8, 16, and a part connected with each of said other elements to contact with the respective surfaces and cam portion of its associated first element and to move therealong upon a relative movement of said elements.

11. A mechanism for displacing an element by a predetermined amount comprising a spindle having a stop thereon, a fixed abutment, a pair of loosely mounted collars upon said spindle between said stop and said fixed abutment, one of said collars having a pair of parallel surfaces at right angles to the axis of said spindle and joined together by an inclined surface, the other of said elements having a part connected thereto to contact with said surfaces and moved relatively therealong upon relative movement of said collars, and means to rotate one of said collars relatively to the other about the spindle axis so that said part and said surfaces move relatively and the part moves from one parallel surface up along the said inclined surface until it comes to abut on the second parallel surface of said first element.

12. A mechanism for displacing an element by a predetermined amount comprising a fixed abutment, a movable abutment connected to the element to be displaced, a pair of loosely mounted elements between said fixed and movable abutments, one of said elements having a pair of parallel surfaces connected together by an inclined surface, said other element having means thereon to contact with said surfaces, means to displace one element relatively to the other so that a point on said first means moves from one parallel surface along the inclined surface until it comes to abut on the second parallel surface, and an electro-magnetic control means for controlling the number of times one element is displaced relatively to the other.

13. A mechanism for displacing an element by a predetermined amount comprising a fixed abutment, a movable abutment connected to the element to be displaced, a pair of loosely mounted elements between said fixed and movable abutments, one of said elements having a pair of parallel surfaces connected together by an inclined surface, the other of said elements having means thereon to contact said surfaces and to be moved relatively thereto, means to displace one element relatively to the other so that the means on said second element moves from one parallel surface of said first element along the inclined surface until it comes to abut on the second parallel surface thereof, a constantly reciprocating element, electro-magnetic means to clutch said constantly reciprocating element to one of said movable elements, a rotating commutator segment, and means controlled from said segment to govern the number of times which the last named movable element is clutched to the said reciprocating element.

14. A mechanism for displacing an element by a predetermined amount comprising a fixed abutment, a movable abutment connected to the element to be displaced and a pair of loosely mounted elements between said fixed and movable abutments, one of said elements having a pair of parallel surfaces thereon connected together by an inclined surface, the other of said elements having a part to contact with and move along said surfaces, means to displace one of said loosely mounted elements relatively to the other so that said part moves from one parallel surface along the inclined surface until it comes to abut on the second parallel surface, a constantly reciprocating element, electro-magnetic means to clutch said constantly reciprocating element to one of said loosely mounted elements whereby to move the same relatively to the other of said loosely mounted elements, a rotating commutator segment, brushes on the commutator segment controlling the electro-magnetic means operating the connection between said constantly reciprocating element and said loosely mounted element, means to hold said brushes normally away from said segment, and means to selectively release said brushes on to said segment.

15. A mechanism for displacing an element by a predetermined amount comprising a fixed abutment, a movable abutment connected to the element to be displaced and a pair of loosely mounted elements between said fixed and movable abutments, one of said elements having a pair of parallel surfaces thereon connected together by an inclined surface, the other of said elements having a part to contact with and move along said surfaces, means to displace one of said loosely mounted elements relatively to the other so that said part moves from one parallel surface along the inclined surface until it comes to abut on the second parallel surface, a constantly reciprocating element, electro-magnetic means to clutch said constantly reciprocating element to one of said loosely mounted elements whereby to move the same relatively to the other of said loosely mounted elements, a rotating commutator segment, brushes on the commutator segent controlling the electro-magnetic means operating the connection between said constantly reciprocating element and said loosely mounted element, means to hold said brushes normally away from said segment, and key controlled means to selectively release said brushes on to said segment.

16. A mechanism for displacing an element by a predetermined amount comprising a fixed abutment, a movable abutment connected to the element to be displaced and a pair of loosely mounted elements between said fixed and movable abutments, one of said elements having a pair of parallel surfaces thereon connected together by an inclined surface, the other of said elements having a part to contact with and move along said surfaces, means to displace one of said loosely mounted elements relatively to the other so that said part moves from one parallel surface along the inclined surface until it comes to abut on the second parallel surface, a constantly reciprocating element, electro-magnetic means to clutch said constantly reciprocating element to one of said loosely mounted elements whereby to move the same relatively to the other of said loosely mounted elements, a rotating commutator segment, brushes on the commutator segment controlling the electro-magnetic means operating the connection between said constantly reciprocating element and said loosely mounted element, means controlled from said segment to govern the number of times which the said movable loosely mounted element is clutched to the said reciprocating element, electro-magnets for holding said brushes away from said segment, and key controlled means for selectively operating the release of said holding electro-magnets whereby to permit said brushes to come in contact with said segment.

In witness whereof, we have hereunto signed our names this 8th day of November, 1922.

EDGAR KENNETH HUNTER.
JOHANNES ROBERT CARL AUGUST.